G. W. COPELAND.
COTTON PLANTER.
APPLICATION FILED MAR. 25, 1909.
970,186.
Patented Sept. 13, 1910.
Fig. 1.
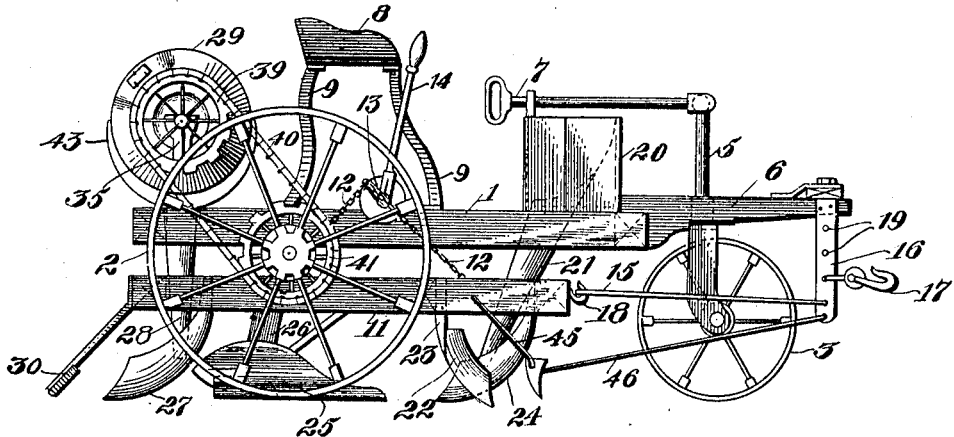
Fig. 2.
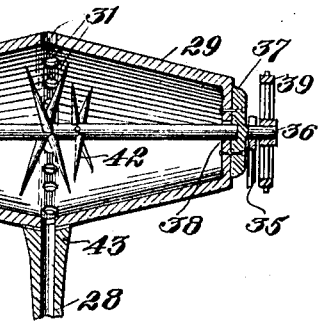
Fig. 3.
Witnesses
D. C. Wilson
F. O. Parker
Inventor
GEORGE W. COPELAND.
By Robert D. Johnston, Jr.
Attorney

UNITED STATES PATENT OFFICE.

GEORGE W. COPELAND, OF ENSLEY, ALABAMA, ASSIGNOR OF ONE-HALF TO GEORGE R. BYRUM, OF ENSLEY, ALABAMA.

COTTON-PLANTER.

970,186.  Specification of Letters Patent.  Patented Sept. 13, 1910.

Application filed March 25, 1909. Serial No. 485,644.

*To all whom it may concern:*

Be it known that I, GEORGE W. COPELAND, a citizen of the United States, residing at Ensley, in the county of Jefferson and State of Alabama, have invented new and useful Improvements in Cotton-Planters, of which the following is a specification.

My invention relates to an improvement in cotton planters and has for its object to provide a complete machine which will break the earth, introduce the fertilizer, turn the earth with bedding moldboards, open the furrow, drop in the seed and then cover same, all operations being performed by the machine under the control of one operator and in a manner best calculated to produce even regular planting.

My invention further comprises certain improvements in the seed drum, which overcome the difficulties heretofore encountered in securing a regular graduated feed of the cotton seed to the furrow, which difficulties arise from the tendency of the seed to mat together in the drum so that they clog the outlet openings instead of falling therethrough.

My invention further comprises the details of construction and arrangement of parts hereinafter more particularly described and claimed, reference being had to the accompanying drawings, in which:

Figure 1 is a side elevation of my improved cotton planter. Fig. 2 is a rear view of the same. Fig. 3 is a vertical sectional view of the seed drum.

Similar reference numerals refer to similar parts throughout the drawings.

The main frame 1 of the cotton planter is supported by the main wheels 2 and guided by a front wheel 3 which is journaled between the bifurcated arms 4 of the pivoted member 5, which is suitably mounted in the forward extension 6 of the main frame and is adapted to be rocked to the right or left for guiding purposes by means of a handle 7, which is disposed to the rear and in easy reach of the seat 8 which is mounted on supports 9 connected to the main frame 1. The wheels 2 are mounted upon the shaft 10 which has suitable bearings disposed below and connected to the main frame. This shaft passes between the main frame and the lower adjustable frame 11 which supports the various implements for preparing the ground for the reception of the fertilizer and cotton seed. This frame 11 is adjustably supported by means of chains 12, which connect thereto and to a crank 13, operated by a lever 14 mounted on the main frame adjacent to the seat. At its forward end the frame 11 at each side is connected by a rod 15 to a hanger 16, to which the trace hook 17 is adjustably connected, each rod 15 being connected at one end to a hook 18 in the frame 11 and having its forward end bent into one of the openings 19 in the hanger. At the forward end of the frame 1 is mounted a fertilizer box 20 which may be of any standard construction and from which the fertilizer is shaken and fed by any suitable means down through a chute 21. At its forward end the frame 11 carries plows 22 which serve to break the soil. These plows are connected to the frame by shanks 23 which are bolted or secured by clips (not shown) to the frame 11. I provide opening blades 24 also suitably connected to the frame 11 and adapted to open up a furrow in the soil broken by the stirrer blades 22 and immediately in front of the discharge end of the spout 21 through which the fertilizer drops. To the rear of the blades 22 and 24 I provide a pair of moldboards 25 fastened to the standards 26 and connected to the frame 11, which moldboards serve to bed the ground immediately in front of a pair of opening blades 27 connected to the rear cross piece of the frame and disposed just in front of the lower discharge end of the spout 28, through which the cotton seed falls from the seed drum 29 supported at the rear of the frame 1. The coverer 30 is connected to the rear end of the frame 11 and serves to cover the furrow opened by the blades 27 and into which the cotton seed has been deposited through the chute 28.

Referring to Fig. 2 it is seen that the seed drum 29 is circular in shape and increases in diameter toward its center where I provide an annular row of seed openings 31. The drum is supported loosely at one end on a shaft 32 having a squared end 33 supported and held against rotation by the standard 34 connected to the frame 1. At its other end the drum is supported by standards 35 which receive a rounded stud 36 which projects at right angles from a plat 37 which is bolted to the end of the seed drum and in line with the axial center thereof. The inner end of the shaft 32 rests loosely in a bearing 38 formed in the plate 37. At its outer end the stud 36 has a sprocket gear 39 fastened thereto and adapted to be driven by a sprocket chain 40 from a sprocket 41 fastened to and rotatable with the adjacent wheels 2. The end 33 of the shaft 32 being squared, the same is held against rotation while the drum 29 will be revolved by the sprocket wheel 39 and stud 36, turning on the shaft 33 and bearing 35. The shaft 32, opposite the large center of the drum, carries a spirally arranged series of stirrer blades 42 which prevent the bedding of the seed and tend to feed the same toward the discharge openings 31. To catch the seed I provide a narrow semicircular hopper 43 which covers the lower semicircle of openings 31 and connects with the seed chute 28 which extends downwardly behind the opening blades 27. For the purposes of alinement I provide a marker blade 44 supported by a rod 45 from the frame 11 and pulled by a rod 46 from the whiffletree.

In operation, as the planter is drawn forward by any suitable draft power, the blades 22 will break the ground which will be opened by the blades 24 and receive the fertilizer through the chute 21, the ground being then bedded by the moldboards 25, opened by the blades 27 to form a furrow which receives the cotton seed which is discharged through the chute 28, and then the seeded furrow covered by the cover-board 30. This movement of the planter, through the sprocket gears and chain, continuously rotates the seed hopper 29 and stirrer blades 42 therein, being stationary, will keep the cotton seed, which has been introduced into the drum through the doors 47, continuously stirred in the feed drum and forced toward the center of the drum over the openings 31, through which the seed will work its way, being caught by the hopper 43 and fed downwardly through the chute 28. The depth of the furrow will be governed by the adjustable lever 14, as described, and the planter may be guided by the wheel 3 and handle 7.

Having thus described my invention, what I claim as new and desire to secure by Letters Patent, is:—

1. A machine of the class described comprising a wheeled main frame, a perforated hanger depending from the forward end of the main frame, a supplemental frame disposed beneath the main frame and having furrow opening blades arranged at the front and rear ends thereof, a rod having one end detachably connected to the supplemental frame and its opposite end adjustably connected to the perforated hanger, stirrer blades fixed to the supplemental frame outside of the front furrow opening blades, a fertilizer box fixed to the front of the main frame and having a discharge spout extended between the front furrow opening blades, and seed distributing means arranged at the rear of the main frame and having a discharge spout disposed between the rear furrow opening blades.

2. A machine of the class described comprising a wheeled main frame, a perforated hanger depending from the forward end of the main frame, a supplemental frame disposed beneath the main frame and having furrow opening blades arranged at the front and rear ends thereof, a rod having one end detachably connected to the supplemental frame and its opposite end adjustably connected to the perforated hanger, stirrer blades fixed to the supplemental frame outside of the front furrow opening blades, a fertilizer box fixed to the front of the main frame and having a discharge spout extended between the front furrow opening blades, seed distributing means arranged at the rear of the main frame and having a discharge spout disposed between the rear furrow opening blades, a cover carried by the supplemental frame in rear of the rear furrow opening blades, and flexible means for holding the supplemental frame in various elevated positions.

3. In a machine of the class described, a wheeled main frame, a supplemental frame loosely suspended therefrom, furrow opening and closing means carried by the last named frame, uprights rising from the rear ends of the main frame, a stationary shaft mounted in the uprights, a centrally bulged cylinder rotatably mounted on the shaft and having a circumferential row of spaced openings in its bulged portion, a stationary discharge spout having a convexed enlarged end adjacent to the bulged portion of the cylinder and communicating with the latter, driven connections between one of the wheels of the main frame and the cylinder to rotate the latter, and radially arranged outwardly diverging stirrer fingers fixed centrally to the shaft.

In testimony whereof I have hereunto set my hand in presence of two subscribing witnesses.

GEORGE W. COPELAND.

Witnesses:
 NOMIE WELSH,
 ANNIE L. PEACE.